Oct. 26, 1965
T. E. NOAKES
3,214,134
BALANCED FLUID VALVE
Filed Aug. 24, 1962
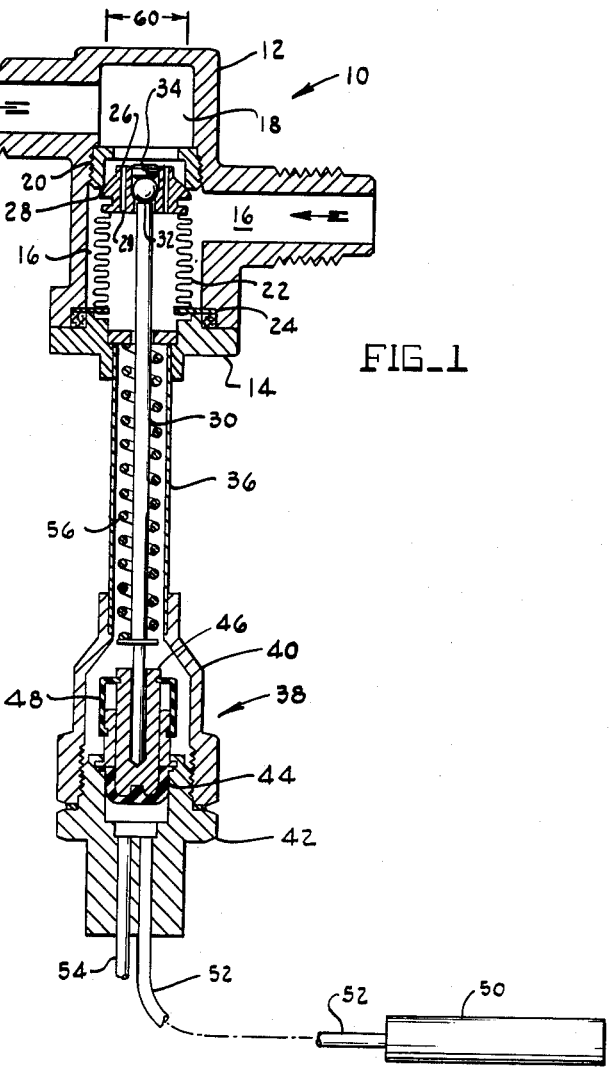
INVENTOR.
THOMAS E. NOAKES
BY
Andrew K. Jones
his ATTORNEY

United States Patent Office 3,214,134
Patented Oct. 26, 1965

3,214,134
BALANCED FLUID VALVE
Thomas E. Noakes, Detroit, Mich., assignor to American Radiator & Standard Sanitary Corporation, New York, N.Y., a corporation of Delaware
Filed Aug. 24, 1962, Ser. No. 219,303
1 Claim. (Cl. 251—282)

This invention relates to fluid valves, as for example steam valves. In some respects it may be considered as an improvement on the invention disclosed and claimed in copending application, Serial No. 55,225, filed September 12, 1960, now abandoned.

One object of the present invention is to provide a valve having a specially proportioned and improved balancing means therein for enabling the valve element to be operated by a relatively small operating force. By using the improved balancing means it is possible to drastically reduce the size of the valve and the force loadings thereon.

A further object is to provide a steam valve in which certain rubber parts are protected from the steam being handled by the valve. To this end the valve is provided with a tubular steam-condensing reservoir which collects condensate and utilizes same as a thermal shield between the steam and rubber parts.

An additional object is to provide a valve in which the chamber which contains the valve element and bellows acts either as the inlet chamber or the outlet chamber. With such an arrangement any rupture of the balancing bellows can be made to cause the valve to fail closed or fail open, whichever is least objectionable in a particular situation.

A general object is to provide a single valve which has the multiple advantages of small size, long service life, improved operating response, fail-safe construction, and low manufacturing cost.

Other objects of this invention will appear from the following description and appended claim, reference being had to the accompanying drawings forming a part of this specification wherein like reference characters designate corresponding parts in the several views.

In the drawings:

FIGURE 1 is a sectional view taken through one embodiment of the invention; and

FIG. 2 is a fragmentary sectional view taken through a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to FIG. 1, there is shown a steam valve 10 comprising a two-piece valve body defined by a major body member 12 and a minor body member or cap 14. Body member 12 is provided with a first chamber 16, a second chamber 18, and a partition 20 which forms a valve seat 28. As shown, chamber 16 is the inlet chamber although for certain applications it would be preferable to utilize chamber 18 as the inlet chamber. When chamber 16 is the inlet the valve has a fail-closed characteristic, and when chamber 18 is the inlet the valve has a fail-open characteristic.

Disposed within chamber 16 is a radially-rigid, axially-extensible bellows 22, the lower end of which is sealed to the valve body, as by connecting the endmost convolution with a fixed annular disc or ring 24. The upper end of the bellows is secured to a valve element 26 which is arranged to engage the valve seat 28 defined by partition 20. Passages 29 are provided in the valve element so that the interior surface of bellows 22 is subjected to the outlet chamber pressure.

In order to operate valve element 26 there may be provided a thrust means comprising a valve stem 30, which preferably has a swivel connection with the valve element. The swivel connection may be achieved through the expedient of welding a ball 32 onto the stem and retaining said ball semi-loosely in the valve element by a set screw 34. With such an arrangement the valve element is better enabled to adjust to the valve seat so as to have a tight sealing fit thereon in the closed position.

As shown in FIG. 1, stem 30 extends downwardly from element 26 through a hollow tubular member 36 which is affixed to valve body member 14. The lower end of member 36 is secured to a head structure 38 defined by two casing members 40 and 42. Within member 42 there is operatively mounted a pressure-responsive or pressure-movable diaphragm 44 and piston 46. Preferably the piston is protected with a rubber sealing boot 48. It will be seen that casing members 40 and 42, together with diaphragm 44, constitute means for sealing the lower end of member 36 from the ambient.

The motive force for operating pressure-responsive diaphragm 44 may be derived from a charged thermal bulb 50 and capillary tubing 52. A second capillary tubing 54 may be extended from casing member 42 to connect with a manually-adjustable piston-diaphragm assembly (not shown) for the purpose of varying the volumetric displacement of the fluid system existing below diaphragm 44, and for thus varying the operating temperature range of bulb 50. It will be understood that the arrangement of bulb 50, diaphragm 44 and adjusting capillary 54 is generally old in the art, and that my invention is concerned therewith only to the extent that it cooperates with my novel arrangement of bellows 22, stem 30, and tubular member 36.

The valve shown in FIG. 1 is designed specifically for controlling the flow of high pressure steam, the temperature of which may be three hundred degrees or higher. When the valve is thus used the incoming steam surrounds the exterior surface of bellows 22. As bulb 50 calls for steam flow it allows compression spring 56 to move stem 30 downwardly to thus move valve element 26 from seat 28. During the opening movement of element 26 bellows 22 acts as a balancing means for preventing the steam pressures from exerting excessive resistance to valve element movement. To accomplish this balancing action the bellows is sized so that its effective area, as defined by dimension 60 in FIG. 1, is made substantially the same as the valve seat area.

In a valve of the illustrated type the pressure drop between the inlet and outlet chambers multiplied by the valve seat area opposes the pressure drop across the bellows multiplied by the bellows effective area. By properly dimensioning the bellows and valve seat and subjecting these members to the inlet and outlet pressures as shown, I am able to achieve a substantially complete balancing action. The bellows and valve element are in effect floatably mounted so that spring 56 can exert a comparatively small force and still operate the valve element to the full open position.

The closing movement of valve element 26 is accomplished by expansion of the charge in bulb 50, and a corresponding upward movement of pressure-responsive wall 44 toward its illustrated position. It will be noted in this regard that wall 44 has an effective area which is relatively small in relation to the area of valve seat 28. Conventionally such a small area wall 44 would be unable to develop sufficient force on the valve stem for operating the valve element against the spring force; instead a much larger area wall would under conventional practice be required. I am able to utilize a small area operator wall 44 because of the balancing action of bellows 22. The use of a small area operator wall is advantageous both because of the size reduction which it permits in all of the associated parts, including bulb 50, and also because of the smaller loadings which are applied to the various parts by spring 56 and the operating fluid.

Referring now to hollow tubular member 36, it will be seen that this member serves to separate valve body 10 from head structure 38 so that the high temperature steam is not allowed to flow around rubber parts 44 and 48. In service the apparatus is positioned with valve body 10 located above member 36 so that steam in outlet chamber 18 can pass downwardly into the interior of bellows 22. Condensation of the steam takes place in the upper portion of member 36 so that the formed condensate can gravitate to the space surrounding boot 48. There is thus in member 36 and around boot 48 a stagnant reservoir of relatively low temperature liquid which protects the rubber parts from the extremely high temperature steam. The protecting action is, as will be noted, achieved without packing or friction type seals such as are prone to leak and add hysteresis to the system.

An interesting feature of the FIG. 1 valve is that the balancing bellows 22 can be located in the inlet chamber such that if it should rupture the inlet pressure will rush through the rupture and force the valve element 26 to the closed position. There will be a small flow through passages 29, but the valve will be essentially in a fail-closed condition. For some situations it would be desirable that the valve have a fail-open condition, in which case the valve would be utilized with chamber 18 as the inlet and chamber 16 as the outlet.

FIG. 1 shows a valve in which an axially extensible bellows is utilized as the pressure balancing means. It is possible however within the broader aspects of the invention to utilize other axially extensible members as balancing devices. For example, there is shown in FIG. 2 the main features of an arrangement in which the balancing means takes the form of an axially extensible metal diaphragm 22a.

In the FIG. 2 arrangement the diaphragm is connected with valve element 26a by a valve stem portion 64 which is suitably drilled out to define a passage 29a between the outlet chamber and the space 66 below the diaphragm. The effective area of the diaphragm is made substantially the same as the area of the valve seat for achieving the desired pressure balancing action.

In service the inlet fluid pressure acts with equal and opposite effect on the lower surface of the valve element and the upper surface of diaphragm 22a so that it has no resultant biasing effect thereon. The outlet pressure acts with equal and opposite effect on the upper surface of the valve element and the lower surface of the diaphragm so that it has no resultant biasing effect thereon.

I prefer to use a bellows as shown in FIG. 1 instead of a diaphragm as shown in FIG. 2 since the bellows provides a longer stroke and has no change in effective area during its stroke. A diaphragm of equivalent area has only a relatively short stroke and undergoes some change in effective area during the stroke. It would be possible by careful manufacturing methods to in some cases employ a piston in lieu of the FIG. 2 diaphragm, but with a piston there are problems of sealing and friction. A bellows as shown in FIG. 1 appears to be the most useful and effective balancing means. Preferably the bellows is sized so there is not an absolutely complete balancing action, since complete balancing would in some cases promote a hunting movement of the valve element which is generally considered disadvantageous.

As shown in FIG. 1, the balancing action is achieved by making the bellows interior communicate with outlet chamber 18 through passages 29 formed within valve element 26. It is contemplated that the desired communication could be achieved by other passage arrangements, as for example by means of a tubular duct mounted with one of its ends extending through cap 14 and with its other end extending through that part of body member 12 which forms the outlet chamber. The illustrated passages 29 are however very simply formed and hence provide a preferred arrangement.

It is contemplated that some rearrangement and redesign not specifically mentioned herein could be resorted to without departing from the spirit of my invention as set forth in the accompanying claim.

I claim:

In combination, a steam valve body having a partition therein defining an inlet chamber, an outlet chamber, and an intervening valve seat;

a bellows disposed within the inlet chamber directly below the valve seat;

a valve element carried by the upper end of the bellows for cooperating engagement with the valve seat to throttle flow therethrough;

means sealing the lower end of the bellows to the valve body so that the exterior surface of the bellows is at all times subjected to the inlet chamber pressure, said valve element having a flow opening therethrough so that the interior surface of the bellows is at all times subjected to the outlet chamber pressure;

said bellows having substantially the same effective area as the valve seat so that the bellows is substantially uninfluenced by the absolute pressures in the individual chambers or by the pressure differential between chambers;

a tubular steam-condensing reservoir extending downwardly from the valve body with its upper interior end portion communicating with the bellows interior so that steam within the bellows can collect as condensate in the reservoir lower end;

means sealing the lower end of the reservoir, including a pressure-movable wall disposed for vertical movement toward and away from the bellows;

and a valve element thrust means extending within the tubular reservoir between the pressure-movable wall and valve element.

References Cited by the Examiner

UNITED STATES PATENTS

| 1,884,794 | 10/32 | McKee | 236—99 |
| 2,331,503 | 10/43 | Ray | 251—335.2 XR |
| 2,548,878 | 4/51 | Dillman | 236—99 |
| 3,009,678 | 11/61 | Soderberg | 251—282 XR |
| 3,087,705 | 4/63 | Hamilton | 251—272 XR |

FOREIGN PATENTS

| 1,234,306 | 5/60 | France. |
| 1,255,839 | 1/61 | France. |
| 956,757 | 1957 | Germany. |
| 42,602 | 1938 | Netherlands. |

WILLIAM F. O'DEA, *Primary Examiner.*